(12) United States Patent
Inoue et al.

(10) Patent No.: US 10,208,900 B2
(45) Date of Patent: Feb. 19, 2019

(54) FLUORESCENCE LIGHT SOURCE DEVICE WITH WAVELENGTH CONVERSION MEMBER WITH PARTICULAR RATIO BETWEEN LIGHT TRANSMISSION PERCENTAGE AND LIGHT REFLECTION PERCENTAGE

(71) Applicant: Ushio Denki Kabushiki Kaisha, Tokyo (JP)

(72) Inventors: Masaki Inoue, Tokyo (JP); Seiji Kitamura, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 80 days.

(21) Appl. No.: 15/502,447

(22) PCT Filed: Sep. 8, 2015

(86) PCT No.: PCT/JP2015/075427
§ 371 (c)(1),
(2) Date: Feb. 7, 2017

(87) PCT Pub. No.: WO2016/039322
PCT Pub. Date: Mar. 17, 2016

(65) Prior Publication Data
US 2017/0219172 A1    Aug. 3, 2017

(30) Foreign Application Priority Data

Sep. 9, 2014   (JP) ................................. 2014-183164
Aug. 7, 2015   (JP) ................................. 2015-156833

(51) Int. Cl.
*F21K 9/64*   (2016.01)
*F21V 9/30*   (2018.01)
(Continued)

(52) U.S. Cl.
CPC ............... *F21K 9/64* (2016.08); *C09K 11/00* (2013.01); *F21V 9/30* (2018.02); *F21V 13/12* (2013.01);
(Continued)

(58) Field of Classification Search
CPC ... F21K 9/64; F21S 41/14; F21S 41/16; F21S 41/176; F21V 9/16; F21V 9/30; G03B 21/204
See application file for complete search history.

(56) References Cited

U.S. PATENT DOCUMENTS

| | | | |
|---|---|---|---|
| 2007/0139949 A1* | 6/2007 | Tanda | F21V 9/30 362/551 |
| 2013/0056775 A1* | 3/2013 | Kawakami | F21V 9/16 257/98 |
| 2014/0168942 A1* | 6/2014 | Kishimoto | F21S 43/13 362/84 |

FOREIGN PATENT DOCUMENTS

| | | |
|---|---|---|
| JP | 2002-129157 A | 5/2002 |
| JP | 2011-244721 A | 12/2011 |

(Continued)

OTHER PUBLICATIONS

International Search Report issued in PCT/JP2015/075427; dated Dec. 15, 2015.
(Continued)

*Primary Examiner* — Anh T Mai
*Assistant Examiner* — Steven Y Horikoshi
(74) *Attorney, Agent, or Firm* — Studebaker & Brackett PC (57) ABSTRACT

A fluorescence light source device includes a wavelength conversion member that emits fluorescence by excitation laser light. The wavelength conversion member has an excitation laser light receiving surface including a periodic structure having a periodic array of conical or truncated (Continued)

projections with an aspect ratio, which is a ratio of the height of the projection to the pitch in the periodic structure, of not lower than 0.2. The wavelength conversion member is formed from a phosphor composed of a polycrystal and contains a micro-scatterer with a refractive index of not lower than 1.0 for scattering the excitation laser light and fluorescence emitted from the phosphor. A ratio (T/R) between a light transmission percentage T [%] in the wavelength conversion member and a light reflection percentage R [%] in the wavelength conversion member is 1 to 20.

5 Claims, 3 Drawing Sheets

(51) Int. Cl.
*F21V 13/12* (2006.01)
*C09K 11/00* (2006.01)
*H05B 33/14* (2006.01)
*F21Y 115/30* (2016.01)
*C09K 11/77* (2006.01)
*F21Y 101/00* (2016.01)

(52) U.S. Cl.
CPC .......... *H05B 33/14* (2013.01); *C09K 11/7706* (2013.01); *F21Y 2101/00* (2013.01); *F21Y 2115/30* (2016.08)

(56) References Cited

FOREIGN PATENT DOCUMENTS

| JP | 2012-064484 A | 3/2012 |
|---|---|---|
| JP | 2012-209228 A | 10/2012 |
| JP | 2013-030720 A | 2/2013 |
| JP | 2014-153527 A | 8/2014 |

OTHER PUBLICATIONS

Written Opinion issued in PCT/JP2015/075427; dated Dec. 15, 2015.
A Notification of Reasons for Refusal mailed by the Japanese Patent Office dated Jun. 16, 2015, which corresponds to Japanese Patent Application No. 2014-183164 and is related to U.S. Appl. No. 15/502,447; with English Translation.
A Notification of Reasons for Refusal mailed by the Japanese Patent Office dated Sep. 8, 2015, which corresponds to Japanese Patent Application No. 2014-183164 and is related to U.S. Appl. No. 15/502,447; with English Translation.
A Notification of Reasons for Refusal mailed by the Japanese Patent Office dated Jul. 5, 2016, which corresponds to Japanese Patent Application No. 2015-156833 and is related to U.S. Appl. No. 15/502,447; with English Translation.
A Decision of Refusal mailed by the Japanese Patent Office dated Feb. 7, 2017, which corresponds to Japanese Patent Application No. 2015-156833 and is related to U.S. Appl. No. 15/502,447; with English Translation.

* cited by examiner

FLUORESCENCE LIGHT SOURCE DEVICE WITH WAVELENGTH CONVERSION MEMBER WITH PARTICULAR RATIO BETWEEN LIGHT TRANSMISSION PERCENTAGE AND LIGHT REFLECTION PERCENTAGE

TECHNICAL FIELD

The present invention relates to a fluorescence light source device. More specifically, the present invention relates to a fluorescence light source device including a wavelength conversion member that emits fluorescence by excitation light.

BACKGROUND ART

Fluorescence light source devices each configured to radiate fluorescence from a phosphor when the phosphor is irradiated with laser light as excitation light have been known conventionally.

Figure 6:
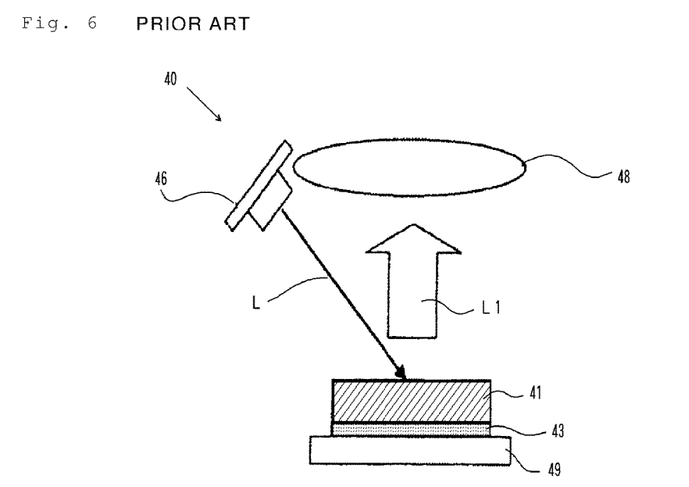
FIG. 6 is an explanatory diagram illustrating the structure of a conventional fluorescence light source device.

One type of such fluorescence light source devices includes: a wavelength conversion member including a fluorescence member 41 constituted by a phosphor; an excitation laser light source 46 for irradiating the wavelength conversion member with excitation light L; and a lens 48 for concentrating fluorescence L1 from the wavelength conversion member as shown in FIG. 6 (see, for example, Patent Literature 1). The wavelength conversion member is disposed on a light reflective substrate 49 via a bonding part 43. A front surface of the wavelength conversion member serves as an excitation light receiving surface as well as a fluorescence emission surface. In this fluorescence light source device 40, pores are contained in the wavelength conversion member, i.e., in the fluorescence member 41.

In fluorescence light source devices, a technique for forming a periodic structure on a front surface of a wavelength conversion member, serving as an excitation light receiving surface, in order to improve excitation light incidence efficiency in the wavelength conversion member has been known (see, for example, Patent Literature 2). Specifically, Patent Literature 2 discloses a fluorescence light source device including a wavelength conversion member including a plate-shaped fluorescence member and a generally plate-shaped light-transmissive member provided to cover a front surface and a peripheral surface of the fluorescence member. In this fluorescence light source device, the light-transmissive member is light-transmissive to excitation light and fluorescence generated in the fluorescence member. A periodic structure including a periodic array of projections is formed in a front surface of the wavelength conversion member, which serves as an excitation light receiving surface. Moreover, pores or scattering microparticles are contained in the light-transmissive member.

In such a fluorescence light source device, however, the excitation light and the fluorescence are scattered by the pores or the scattering microparticles, thereby failing to obtain sufficient fluorescence intensity.

Specifically speaking, part of excitation light having entered into the wavelength conversion member through the excitation light receiving surface is scattered by the pores or the scattering microparticles and allowed to exit to the outside through the excitation light receiving surface without being converted into fluorescence. Thus, the excitation light having entered into the fluorescence member cannot be utilized effectively, resulting in a reduction in an amount of fluorescence exiting through the fluorescence emission surface.

CITATION LIST

Patent Literature

Patent Literature 1: Japanese Patent Application Laid-Open No. 2012-64484
Patent Literature 2: Japanese Patent Application Laid-Open No. 2013-030720

SUMMARY OF INVENTION

Technical Problem

The present invention has been made in view of the foregoing circumstances and has as its object the provision of a fluorescence light source device that can achieve high luminous efficiency.

Solution to Problem

According to the present invention, there is provided a fluorescence light source device including a wavelength conversion member for emitting fluorescence by excitation laser light, wherein
the wavelength conversion member has an excitation light receiving surface including a periodic structure having a periodic array of conical or truncated projections with an aspect ratio, which is a ratio of the height of the projection to the pitch in the periodic structure, of not lower than 0.2,
the wavelength conversion member is formed from a phosphor composed of a polycrystal, and contains a micro-scatterer with a refractive index of not lower than 1.0 for scattering the excitation laser light and fluorescence emitted from the phosphor, and a ratio (T/R) between a light transmission percentage T [%] in the wavelength conversion member and a light reflection percentage R [%] in the wavelength conversion member is 1 to 20.

In the fluorescence light source device of the present invention, the light transmission percentage T [%] in the wavelength conversion member may preferably be a light transmission percentage for light with a wavelength of 600 nm, and the light reflection percentage R [%] in the wavelength conversion member may preferably be a light reflection percentage for light with a wavelength of 600 nm.

According to the present invention, there is provided a fluorescence light source device including a wavelength conversion member for emitting fluorescence by excitation laser light, wherein
the wavelength conversion member has an excitation light receiving surface including a periodic structure having a two-dimensional periodic array of conical or truncated projections,
the wavelength conversion member has a fluorescence member formed from a phosphor composed of a polycrystal, the fluorescence member has a thickness of 0.05 to 0.2 mm and contains a micro-scatterer formed from an inorganic compound particle with a refractive index of not lower than 1.0 for scattering the excitation laser light and fluorescence emitted from the phosphor, and the micro-scatterer has a diameter of 500 to 8000 nm.

In the fluorescence light source device of the present invention, the inorganic compound particle may preferably be composed of alumina.

In the fluorescence light source device of the present invention, the wavelength conversion member may preferably have a ratio (T/R) between a light transmission percentage T [%] in the wavelength conversion member and a light reflection percentage R [%] in the wavelength conversion member within a range of 1 to 20.

In the fluorescence light source device of the present invention, an aspect ratio, which is a ratio of the height of the projection to the pitch in the periodic structure, may preferably be not lower than 0.2.

Advantageous Effects of Invention

In the fluorescence light source device of the present invention, the wavelength conversion member has the specified configuration in which the excitation light receiving surface includes the specified periodic structure and the micro-scatterers with the specified refractive index are contained.

This reduces or prevents the reflection of the excitation light (excitation laser light) off the excitation light receiving surface. The wavelength conversion member can thus achieve high excitation light incidence efficiency.

Moreover, the excitation light having entered into the wavelength conversion member is prevented from exiting to the outside through the excitation light receiving surface without converting the excitation light into fluorescence. Additionally, the traveling direction of the excitation light is changed by the micro-scatterers in the wavelength conversion member, thereby increasing an optical path length for converting the excitation light into the fluorescence. Thus, the excitation light having entered into the wavelength conversion member can be utilized effectively.

Furthermore, since the traveling direction of the fluorescence is changed by the micro-scatterers in the wavelength conversion member, the fluorescence can reach the fluorescence emission surface more easily. This suppresses the confinement of the fluorescence in the wavelength conversion member. Thus, the fluorescence generated in the wavelength conversion member can be effectively utilized and allowed to exit to the outside with high efficiency.

According to the fluorescence light source device of the present invention, since the wavelength conversion member can thus achieve high excitation light incidence efficiency, can effectively utilize the excitation light having entered thereinto to generate fluorescence, and can cause the fluorescence to exit to the outside with high efficiency, high light utilization efficiency can be achieved. Thus, high luminous efficiency can be achieved.

DESCRIPTION OF EMBODIMENTS

An embodiment of a fluorescence light source device of the present invention will be described below.

Figure 1:
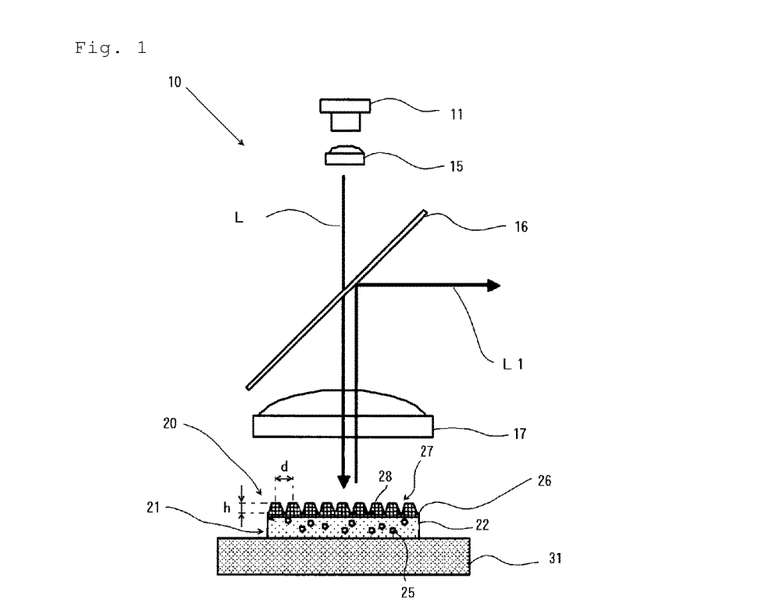
FIG. 1 is an explanatory diagram schematically illustrating the structure of an example of a fluorescence light source device of the present invention.

FIG. 1 is an explanatory diagram schematically illustrating the structure of an example of a fluorescence light source device of the present invention.

As shown in FIG. 1, the fluorescence light source device 10 includes: an excitation laser light source including a laser diode 11; and a fluorescence-emitting member 20 disposed so as to face the laser diode 11. The fluorescence-emitting member 20 includes a wavelength conversion member 21 containing a phosphor that emits fluorescence L1 by being excited by excitation light L, which is laser light emitted from the laser diode 11.

A collimator lens 15 through which the excitation light L having entered from the laser diode 11 exits as parallel rays is disposed at a position adjacent to the laser diode 11 and located between the laser diode 11 and the fluorescence-emitting member 20. Moreover, a dichroic mirror 16 that transmits the excitation light L from the laser diode 11 therethrough and reflects the fluorescence L1 from the wavelength conversion member 21 is disposed between the collimator lens 15 and the fluorescence-emitting member 20 while being inclined at an angle of, for example, 45° with respect to the optical axis of the collimator lens 15. Furthermore, a condenser lens 17 for concentrating the fluorescence L1 exiting from the wavelength conversion member 21 is disposed between the dichroic mirror 16 and the fluorescence-emitting member 20.

As shown in FIG. 1, the fluorescence-emitting member 20 is formed by providing the generally plate-shaped wavelength conversion member 21 on a front surface (upper surface in FIG. 1) of a plate-shaped substrate 31.

The wavelength conversion member 21 includes a plate-shaped fluorescence member 22 and a generally plate-shaped periodic structure layer 26 formed on a front surface (upper surface in FIG. 1) of the fluorescence member 22. The wavelength conversion member 21 emits the fluorescence L1 radiated from the phosphor constituting the fluorescence member 22.

In the wavelength conversion member 21, a front surface (upper surface in FIG. 1) of the periodic structure layer 26 serves as an excitation light receiving surface and as a fluorescence emission surface. The front surface of the periodic structure layer 26 is provided with a periodic structure 27 including a periodic array of plural projections 28.

Moreover, a light reflection film (not shown) is provided on a back surface of the wavelength conversion member 21, i.e., a back surface (lower surface in FIG. 1) of the fluorescence member 22. Moreover, light diffusion films (not shown) are provided on side surfaces of the wavelength conversion member 21. Furthermore, a bonding member (not shown) is interposed between the light reflection film and the substrate 31. The wavelength conversion member 21 is bonded to the front surface of the substrate 31 by the bonding member. As examples of the bonding member, may be mentioned solder (specifically, those made of a gold-tin (AuSn) alloy (the percentage of Sn content is 20 mass %), lead (Pb) and a gold-germanium (AuGe) alloy, for example) and a silver sintered material from the viewpoint of their heat dissipation properties. Moreover, a heat dissipation member (not shown), formed from a metal such as copper, for example, is disposed on a back surface of the substrate 31.

In the example shown in this figure, an enhanced reflection silver film is employed as the light reflection film. Also, a film including fine particles formed of an inorganic compound, such as silica ($SiO_2$) and titania ($TiO_2$), and having a particle size of not lower than 0.2 nm and not more than 0.1 μm is used as the light diffusion film. Specifically, this light diffusion film is formed of an inorganic diffusion material obtained by applying a water-soluble suspension of inorganic compound fine particles to a periphery of the wavelength conversion member 21 and drying the same. The light diffusion film has reflectance of not lower than 95.7% for light with a wavelength of 550 nm.

The wavelength conversion member 21 contains micro-scatterers 25 for scattering the excitation light L from the laser diode 11 and the fluorescence L1 from the phosphor constituting the fluorescence member 22.

Moreover, in the wavelength conversion member 21, a ratio (T/R) between a light transmission percentage T [%] in the wavelength conversion member 21 and a light reflection percentage R [%] in the wavelength conversion member 21 is 1 to 20, preferably 1 to 10.

Here, the light transmission percentage T [%] is a value representing the percentage of light transmitted through the wavelength conversion member 21 among rays of non-excitation light (specifically, light that causes no excitation of the phosphor constituting the wavelength conversion member 21, for example, light with a wavelength of 600 nm) irradiated onto the excitation light receiving surface. The light reflection percentage R [%], on the other hand, is a value representing the percentage of light reflected by the wavelength conversion member 21 (specifically, light reflected off the excitation light receiving surface and light exiting through the excitation light receiving surface) among the rays of non-excitation light irradiated onto the excitation light receiving surface. In other words, the light transmission percentage T [%] is a value representing the percentage of light having entered into the wavelength conversion member 21 via the excitation light receiving surface and traveling toward a surface opposed to the excitation light receiving surface among rays of light irradiated onto the excitation light receiving surface. The light reflection percentage R [%], on the other hand, is a value representing the percentage of light reflected by the wavelength conversion member 21 (specifically, light reflected off the excitation light receiving surface and light having entered into the excitation light receiving surface but scattered toward the excitation light receiving surface by the micro-scatterers 25 and exiting through the excitation light receiving surface) among rays of light irradiated onto the excitation light receiving surface.

When the ratio (T/R) is in the aforementioned range, the wavelength conversion member 21 can have high light utilization efficiency as is apparent from experimental examples to be described later.

Specifically speaking, if the ratio (T/R) relating to light with a wavelength of 600 nm (light not excited by the wavelength conversion member) falls within the aforementioned range, the reflection of the excitation light L off the excitation light receiving surface is reduced by the periodic structure layer 26 (periodic structure 27). Furthermore, since the wavelength conversion member 21 has a structure containing the micro-scatterers 25 therein, the excitation light L having entered into the wavelength conversion member 21 is absorbed, to prevent the excitation light L having been scattered toward the excitation light receiving surface from exiting through the excitation light receiving surface. Thus, the excitation light L having entered into the wavelength conversion member 21 can be prevented from exiting to the outside through the excitation light receiving surface without converting the excitation light L into the fluorescence L1. Additionally, the traveling direction of the excitation light L is changed by the micro-scatterers 25 in the wavelength conversion member 21, thereby increasing an optical path length for converting the excitation light L into the fluorescence L1. Thus, the excitation light L can be absorbed sufficiently in the wavelength conversion member 21. Furthermore, since the excitation light L is converted into the fluorescence L1 in the vicinity of the excitation light receiving surface, the fluorescence L1 can be easily extracted. Moreover, since the fluorescence L1 generated in the wavelength conversion member 21 changes its light direction by the micro-scatterers 25, the fluorescence L1 can be easily extracted from the fluorescence emission surface. Thus, high light extraction efficiency of the fluorescence can be achieved. Therefore, the wavelength conversion member 21 can achieve high light utilization efficiency.

Here, the light utilization efficiency obtained in the wavelength conversion member 21 refers to a value calculated by the following formula (1) on the basis of the product of the percentage of the excitation light L having entered into the excitation light receiving surface but not exiting through the excitation light receiving surface (hereinafter referred to also as "transmittance of the excitation light L at the excitation light receiving surface") and light extraction efficiency at the fluorescence emission surface, i.e., the reflectance of the excitation light L at the excitation light receiving surface and the light extraction efficiency at the fluorescence emission surface. Since the product of the transmittance of the excitation light L at the excitation light receiving surface and the light extraction efficiency is proportional to fluorescence efficiency of the fluorescence member 22, such a product can be regarded as a percentage of the excitation light L that is converted into the fluorescence L1 by the wavelength conversion member 21. The wavelength conversion member having higher light utilization efficiency has a higher fluorescence conversion capacity. Specifically, the light utilization efficiency of the wavelength conversion member 21 can be obtained by multiplying the light extraction efficiency at the fluorescence emission surface by the light transmission percentage T [%]. Note that the light transmission percentage T [%] as used herein is a value that can be regarded as the "transmittance of the excitation light L at the excitation light receiving surface" and the light reflection percentage R [%] as used herein is a value that can be regarded as the "reflectance of the excitation light L."

Light utilization efficiency [%] of wavelength conversion member=(100−reflectance [%] of excitation light at excitation light receiving surface)×light extraction efficiency [%] at fluorescence emission surface   Formula (1):

The light transmission percentage T [%] and the light reflection percentage R [%] are measured as follows.

For the light transmission percentage T [%], a semispherical integrating sphere is first disposed so that an opening of the integrating sphere is opposed to the surface (hereinafter referred to also as the "back surface") opposed to the excitation light receiving surface of the wavelength conversion member 21. The excitation light receiving surface is then irradiated with non-excitation light (for example, light with a wavelength of 600 nm). Thereafter, light intensity $I_0$ of the non-excitation light is measured and light intensity $I_r$ of light from the back surface of the wavelength conversion member 21, which is measured in the integrating sphere, is measured. The light transmission percentage T [%] can be calculated on the basis of the obtained light intensity $I_0$ and light intensity $I_r$. In other words, the light transmission percentage T [%] is represented by the percentage of the light intensity $I_r$ to the light intensity $I_0$.

For the light reflection percentage R [%], on the other hand, a semispherical integrating sphere is first disposed so that an opening of the integrating sphere is opposed to the excitation light receiving surface of the wavelength conversion member 21. The excitation light receiving surface is then irradiated with non-excitation light (for example, light with a wavelength of 600 nm). Thereafter, the light intensity $I_0$ of the non-excitation light is measured and light intensity $I_f$ of light from the excitation light receiving surface of the wavelength conversion member 21, which is measured in the integrating sphere, is measured. The light reflection percentage R [%] can be calculated on the basis of the obtained light intensity $I_0$ and light intensity $I_f$. In other words, the light reflection percentage R [%] is represented by the percentage of the light intensity $I_f$ to the light intensity $I_0$.

In the wavelength conversion member 21, the light transmission percentage T [%] and the light reflection percentage R [%] can be controlled, for example, by the shape of the periodic structure 27 (specifically, the aspect ratio (h/d), for example), the dimension (diameter) and content percentage of the micro-scatterers 25 and the thickness of the fluorescence member 22.

As shown in FIG. 1, the wavelength conversion member 21 contains a plurality of micro-scatterers 25 and such plurality of micro-scatterers 25 are contained in the fluorescence member 22.

The plurality of micro-scatterers 25 contained in the fluorescence member 22 have a refractive index of not lower than 1.0.

Specifically, the plurality of micro-scatterers 25 are formed by pores, microparticles having a refractive index different from that of the fluorescence member 22 (hereinafter referred to also as "scattering microparticles") or grain boundary precipitation phases.

As examples of the scattering microparticle constituting the micro-scatterer 25, may be mentioned inorganic compound particles formed from inorganic compounds such as alumina, yttria, silicon nitride, aluminum nitride and strontium fluoride.

The fluorescence member 22 is formed of a polycrystalline phosphor. Specifically, the fluorescence member 22 is formed of a polycrystalline phosphor and contains the micro-scatterers 25 formed by pores, scattering microparticles or grain boundary precipitation phases. In other words, the fluorescence member 22 is constituted by a polycrystalline phosphor containing pores, scattering microparticles or grain boundary precipitation phases.

The fluorescence member 22 constituted by such a polycrystalline phosphor allows the fluorescence member 22 to have high heat conductivity. Thus, heat generated by the irradiation of the excitation light L is discharged efficiently in the fluorescence member 22, preventing the fluorescence member 22 from having a high temperature. When a scattering microparticle is used as the micro-scatterer 25 and the scattering microparticle has a heat conductivity higher than that of the phosphor constituting the fluorescence member 22, in particular, a temperature increase in the fluorescence member 22 can be further reduced. Moreover, the fluorescence member 22 constituted by a polycrystalline phosphor allows the wavelength conversion member 21 containing the micro-scatterers 25 to be easily obtained.

A porosity of the fluorescence member 22 is basically not higher than 0.5% from the viewpoint of the heat dissipation property (heat conductivity), for example. When the micro-scatterers 25 are formed by pores, however, the porosity may be higher than 0.5%. Here, the micro-scatterers 25 constituted by pores refer to a concept including the micro-scatterers 25 constituted by pores and scattering microparticles or grain boundary precipitation phases.

As specific examples of the polycrystalline phosphor constituting the fluorescence member 22, may be mentioned YAG:Ce, YAG:Pr, YAG:Sm, (Y,Gd)AG:Ce, LuAG:Ce, CASN:Eu and sialon:Eu. Although a doped amount of an activator in such a phosphor is appropriately determined in accordance with, for example, the structure of the micro-scatterer 25, such a doped amount is specifically about 0.5 mol %.

Here, the fluorescence L1 generated from the phosphor constituting the fluorescence member 22 is light with a peak wavelength of, for example, 520 to 650 nm.

Moreover, the thickness of the fluorescence member 22 is preferably 0.05 to 2.0 mm from the viewpoint of the effective utilization of the excitation light and the heat dissipation property.

The fluorescence member 22 including pores as the micro-scatterers 25 can be obtained by the following techniques (1) to (3), for example.

Among the following techniques (1) to (3), the technique (1) is preferably used from the viewpoint of the ease of controlling the dimension (diameter) and content percentage of the micro-scatterers 25.

(1) First, raw materials (specifically, a base material, an activator and a firing aid) are crushed with a ball mill, for example, to obtain raw material fine powder of not larger than a submicron size. The obtained raw material fine powder, resin beads for forming pores and an organic solvent are used to prepare a slurry in which the raw material fine powder and the resin beads are uniformly dispersed in the organic solvent.

Next, a molded article is made from the obtained slurry by a slip casting method and the molded article is subjected to firing. In the course of forming a fired article, the resin beads are burned away, thus obtaining the fluorescence member 22 formed from the fired article and containing pores as the micro-scatterers 25.

According to this technique, the shape and size of the pores as well as the content percentage of the pores (porosity) in the fluorescence member 22 to be obtained can be adjusted by adjusting the shape, particle size and number of the resin beads to be used. Accordingly, the dimension (diameter) of the micro-scatterer 25 and the content percentage of the micro-scatterers 25 in the wavelength conversion member 21 can be adjusted, and thus the ratio (T/R) in the wavelength conversion member 21 can be controlled easily.

(2) First, raw materials (specifically, a base material, an activator and a firing aid) are crushed with a ball mill, for example, to obtain raw material fine powder with a diameter of 0.2 μm, for example. The obtained raw material fine powder and an organic solvent are used to prepare a slurry in which the raw material fine powder is uniformly dispersed in the organic solvent.

Next, a molded article is made from the obtained slurry by the slip casting method. The molded article is subjected to firing and then subjected to vacuum firing, thus obtaining the fluorescence member 22 formed from a fired article and containing pores as the micro-scatterers 25. Here, as the conditions of the vacuum firing, the degree of vacuum is $1\times10^{-7}$ Pa, the firing temperature is 1300 to 1750° C. and the retention time (treatment time) is three hours.

According to this technique, the porosity of the fluorescence member 22 to be obtained can be adjusted to have any percentage in a range lower than 0.6% by adjusting the conditions of the vacuum firing (specifically, the firing temperature of the vacuum firing) within the aforementioned range. Thus, the content percentage of the micro-scatterers 25 can be adjusted.

(3) First, raw materials (specifically, a base material, an activator and a firing aid) are crushed with a ball mill, for example, to obtain raw material fine powder with a diameter of 0.2 μm, for example. The obtained raw material fine powder and an organic solvent are used to prepare a slurry in which the raw material fine powder is uniformly dispersed in the organic solvent.

Next, a molded article is made from the obtained slurry by the slip casting method. The molded article is subjected to firing and then subjected to vacuum firing. Here, as the conditions of the vacuum firing, the degree of vacuum is $1\times10^{-7}$ Pa, the firing temperature is 1750° C. and the retention time (firing time) is three hours. According to such vacuum firing conditions, a fired article with a porosity of 99.2 to 99.4% is obtained.

Thereafter, the obtained fired article is subjected to hot isostatic pressing processing (HIP), thus obtaining the fluorescence member 22 formed from the fired article and containing pores as the micro-scatterers 25. Here, as the conditions of the hot isostatic pressing processing, the heating temperature is 1350 to 1800° C. and the retention time (treatment time) is five hours.

According to this technique, the porosity of the fluorescence member 22 to be obtained can be adjusted to have any percentage within a range of 0.1 to 0.8% by adjusting the conditions of the hot isostatic pressing processing (specifically, the heating temperature of the hot isostatic pressing processing) within the aforementioned range. Thus, the content percentage of the micro-scatterers 25 can be adjusted.

The fluorescence member 22 including grain boundary precipitation phases as the micro-scatterers 25 can be obtained by adjusting a compounding ratio of raw materials (specifically, constituents of a base material, the base material, an activator and a firing aid).

Specifically, in (Y,Gd)AG:Ce, for example, YAG is doped with Gd in the course of producing the base material. Although Gd is substituted for Y in YAG, a precipitation phase (grain boundary phase) having a gadolinium aluminate perovskite structure is generated on a grain boundary face when the doped amount of Gd is greater than the solubility limit. In other words, the fluorescence member 22 constituted by the polycrystalline phosphor made of (Y,Gd)AG:Ce can have a grain boundary precipitation phase. In addition to (Y,Gd)AG:Ce, a grain boundary precipitation phase can be precipitated when YAG is doped with Sm or Ce, for example.

The fluorescence member 22 including scattering microparticles as the micro-scatterers 25 can be obtained by the following technique, for example.

First, raw materials (specifically, a base material, an activator and a firing aid) are crushed with a ball mill, for example, to obtain raw material fine powder of not larger than a submicron size. The obtained raw material fine powder, scattering microparticles and an organic solvent are used to prepare a slurry in which the raw material fine powder and the scattering microparticles are uniformly dispersed in the organic solvent.

Next, a molded article is made from the obtained slurry by the slip casting method. The molded article is subjected to firing, thus obtaining the fluorescence member 22 formed from the fired article and containing the scattering microparticles as the micro-scatterers 25.

According to this technique, the shape and size of the micro-scatterer 25 as well as the content percentage of the scattering microparticles in the fluorescence member 22 to be obtained can be adjusted by adjusting the shape, particle size and number of the scattering microparticles to be used. Accordingly, the diameter of the micro-scatterer 25 and the content percentage of the micro-scatterers 25 in the wavelength conversion member 21 can be adjusted, and thus the ratio (T/R) in the wavelength conversion member 21 can be controlled easily.

In the thus obtained wavelength conversion member 21 having the fluorescence member 22 containing the micro-scatterers 25 formed by the scattering microparticles (inorganic compound particles), the ratio (T/R) can be set to fall within a specified range of 1 to 20 by constituting the periodic structure 27 by arranging the projections 28 in a two-dimensional periodic pattern, and by setting the thickness of the fluorescence member 22 to 0.05 to 0.2 mm and the diameter of the micro-scatterer 25 to 500 to 8000 nm.

The periodic structure layer 26 is obtained by forming the periodic structure 27 in the front surface (upper surface in FIG. 1) of the wavelength conversion member 21, which serves as the excitation light receiving surface.

As shown in FIG. 1, the projections 28 constituting the periodic structure 27 each have a generally conical shape with a smaller diameter in a direction from the back surface to the front surface.

Specifically, the projection 28 has a truncated shape as shown in FIG. 1 (circular truncated conical shape in FIG. 1) or a conical shape.

Here, when the projection 28 has a truncated shape, the dimension (maximum dimension) of an upper base is less than the wavelength of the excitation light L.

In the example shown in this figure, the periodic structure 27 is formed by compactly arranging the projections 28, each having a truncated conical shape, in a two-dimensional periodic pattern on a plate-shaped thin film covering the front surface of the fluorescence member 22.

When the excitation light receiving surface, i.e., the front surface of the periodic structure layer 26 is irradiated with the excitation light L through the air (a refractive index of 1), the projection 28 having a conical shape or truncated shape allows the excitation light L to be incident from a direction inclined with respect to the tapered surface of the projection 28. This substantially eliminates an interface at which the refractive index drastically changes, thus preventing or reducing the reflection of the excitation light L off the excitation light receiving surface.

Moreover, the inclination angle (angle made by the side surface and the bottom surface) of the tapered surface (side surface) in the projection 28 is preferably not lower than 11°.

When the inclination angle of the tapered surface is excessively small, there is a possibility of generating reflected light according to a refractive index difference between air and the material of the member that constitutes the excitation light receiving surface (specifically, the material that constitutes the periodic structure layer 26).

In the periodic structure 27, the aspect ratio (h/d), which is a ratio of the height h of the projection 28 to the pitch d, is not lower than 0.2, preferably 0.2 to 1.5, most preferably 0.5 to 1.0.

Here, the pitch of the periodic structure as used in the present invention refers to a center-to-center distance (nm) between the projections adjacent to each other in the periodic structure.

The periodic structure 27 having an aspect ratio of not lower than 0.2 can reduce the reflection of the excitation light L at the front surface of the periodic structure layer 26, i.e., at the front surface of the wavelength conversion member 21. Thus, the excitation light L can be sufficiently introduced into the fluorescence member 22 when the front surface of the periodic structure layer 26 is irradiated with the excitation light L.

Moreover, the periodic structure 27 having an aspect ratio of not lower than 0.2 allows the fluorescence L1 emitted from the phosphor constituting the fluorescence member 22 to be extracted to the outside with high efficiency from the front surface of the periodic structure layer 26, which is the fluorescence emission surface of the wavelength conversion member 21.

Moreover, the pitch d in the periodic structure 27 preferably has a size in a range in which the diffraction of the fluorescence L1 emitted from the phosphor constituting the fluorescence member 22 occurs (Bragg condition).

Specifically, the pitch d of the periodic structure 27 is a value (hereinafter referred to as an "optical length") obtained by dividing the peak wavelength of the fluorescence L1 emitted from the phosphor by the refractive index of the material that constitutes the periodic structure 27 (specifically, the material that constitutes the periodic structure layer 26) or a value about several times as long as the optical length.

As a result of the pitch d of the periodic structure 27 having a size within the range in which the diffraction of the fluorescence L1 generated in the fluorescence member 22 occurs, the fluorescence L1 can be allowed to exit to the outside with high efficiency from the front surface of the periodic structure layer 26, which is the fluorescence emission surface of the wavelength conversion member 21.

A preferred material that constitutes the periodic structure layer 26 is an inorganic material since the inorganic material has translucency to the excitation light L and the fluorescence L1 and energy that excites the phosphor in the fluorescence member 22 has an excitation density of not lower than about 5 W/mm$^2$.

Moreover, a preferred material that constitutes the periodic structure layer 26 is a material having a refractive index larger than that of the fluorescence member 22.

The use of the material having a higher refractive index than the fluorescence member 22 as the material that constitutes the periodic structure layer 26 prevents the fluorescence L1 generated in the fluorescence member 22 from being totally reflected at the interface between the fluorescence member 22 and the periodic structure layer 26. Furthermore, the fluorescence L1 incident on the interface between the fluorescence member 22 and the periodic structure layer 26 is refracted so that an exiting angle at such an interface becomes smaller by being transmitted through the interface. Thus, the traveling direction of the fluorescence L1 is changed at the interface between the fluorescence member 22 and the periodic structure layer 26, thereby suppressing the confinement of the fluorescence L1 in the wavelength conversion member 21. Thus, the fluorescence L1 can be allowed to exit to the outside from the fluorescence emission surface with high efficiency. Moreover, it becomes possible to form the periodic structure 27 with a small pitch d. Therefore, the projections 28 constituting the periodic structure 27 can be designed to have a small height for a large aspect ratio, thereby facilitating the formation of the periodic structure 27. When a nanoprint method is used, for example, it is easy to produce a mold and perform imprinting.

As examples of the material that constitutes the periodic structure layer 26, may be mentioned silica (a refractive index of 1.45 to 1.7), titania (a refractive index of 1.9 to 2.2), zirconia (a refractive index of 1.7 to 1.8) and silicon nitride (a refractive index of 1.7 to 2.0).

Moreover, the thickness of the periodic structure layer 26 is 0.1 to 1.0 µm, for example.

The periodic structure layer 26 can be formed by using a sol-gel method and a nanoimprint method. Specifically, a sol material containing an alkoxide such as silicon, titanium or zirconium is applied to the front surface of the fluorescence member 22 by a spin coat method, for example. The applied sol material is heated while being impressed by a mold, released from the mold and then subjected to heat treatment. The heat treatment promotes reactions (hydrolysis and condensation polymerization), thus forming the periodic structure layer 26 formed from the inorganic material and including the periodic structure 27 formed in the front surface thereof.

Alternatively, the periodic structure layer 26 can be formed by using the nanoimprint method and dry etching treatment. Specifically, a resist is applied to a front surface of a plate-shaped inorganic material layer by the spin coat method, for example. Next, the applied film of the resist is patterned by the nanoimprint method, for example. Thereafter, the patterned resist is subjected to the dry etching treatment, thus forming the periodic structure layer 26 formed from the inorganic material and including the periodic structure 27 formed in the front surface thereof.

As examples of the substrate 31, may be mentioned an aluminum substrate via a heat dissipation adhesive in which metal fine powder is mixed into a resin and a metal substrate formed from a material such as copper or an alloy of molybdenum and copper (Mo—Cu). Moreover, the thickness of the substrate 31 is 0.5 to 5.0 mm, for example. Moreover, the aluminum substrate and the metal substrate constituting the substrate 31 may also have the function of a heat-dissipating fin.

In the fluorescence light source device 10, the collimator lens 15 makes the excitation light L emitted from the laser diode 11 be parallel rays. Thereafter, the excitation light L transmits through the dichroic mirror 16 and the condenser lens 17 to be irradiated onto the excitation light receiving surface of the wavelength conversion member 21 in the fluorescence-emitting member 20, i.e., the front surface of the periodic structure layer 26 in a direction generally perpendicular thereto. The excitation light L then enters the fluorescence member 22 through the periodic structure layer 26. The phosphor constituting the fluorescence member 22 is then excited in the fluorescence member 22. This causes the phosphor to emit the fluorescence L1 in the fluorescence member 22. The fluorescence L1 is allowed to exit through the fluorescence emission surface, i.e., the front surface of the periodic structure layer 26. The fluorescence L1 is concentrated by the condenser lens 17, then is reflected by the dichroic mirror 16 in a perpendicular direction, and is allowed to exit to the outside of the fluorescence light source device 10.

Furthermore, the wavelength conversion member 21 in the fluorescence light source device 10 includes the periodic structure 27 formed in the excitation light receiving surface, contains the micro-scatterers 25 having a specified refractive index and has a ratio (T/R) in a specified range.

This reduces the reflection of the excitation light L off the excitation light receiving surface of the wavelength conversion member 21, thus obtaining high excitation light incidence efficiency in the wavelength conversion member 21.

Moreover, the excitation light L having entered into the fluorescence member 22 is prevented from exiting to the outside through the excitation light receiving surface without converting the excitation light L into the fluorescence L1. Additionally, the traveling direction of the excitation light L is changed by the micro-scatterers 25 in the fluorescence member 22, thereby increasing the optical path length for converting the excitation light L into the fluorescence L1. Thus, the excitation light L having entered into the wavelength conversion member 21 can be utilized effectively.

Furthermore, since the traveling direction of the fluorescence L1 is changed by the micro-scatterers 25 in the fluorescence member 22, the fluorescence L1 can reach the fluorescence emission surface more easily. This suppresses the confinement of the fluorescence L1 in the wavelength conversion member 21. Thus, the fluorescence L1 generated in the wavelength conversion member 21 can be effectively utilized and allowed to exit to the outside with high efficiency.

According to the fluorescence light source device 10, since the wavelength conversion member 21 can thus achieve high excitation light incidence efficiency, can effectively utilize the excitation light L having entered thereinto to generate the fluorescence L1, and can allow the fluorescence L1 to exit to the outside with high efficiency, high light utilization efficiency can be achieved. Thus, high luminous efficiency can be achieved.

Furthermore, since the optical path length for converting the excitation light L into the fluorescence L1 in the fluorescence member 22 is increased by the action of the micro-scatterers 25 in the fluorescence light source device 10, the thickness of the fluorescence member 22 can be reduced and thus the thickness of the wavelength conversion member 21 can be reduced without having an adverse effect of deteriorating the ability to utilize the excitation light effectively. The reduced thickness of the wavelength conversion member 21 leads to a reduction in heat resistance of the wavelength conversion member 21, thus suppressing a temperature rise in the wavelength conversion member 21. Consequently, it is possible to reduce a reduction in the amount of fluorescence due to the occurrence of temperature quenching in the phosphor. Thus, even higher luminous efficiency can be obtained. Specifically, the temperature of the wavelength conversion member 21 can be reduced by 30° C. by reducing the thickness of the fluorescence member 22 in the wavelength conversion member 21 from 0.13 mm to 0.1 mm. This can improve the light extraction efficiency by 13%.

Moreover, since the wavelength conversion member 21 is formed by the fluorescence member 22 and the periodic structure layer 26 in the fluorescence light source device 10, there is no need for the fluorescence member 22 to have a periodic structure. This facilitates the formation of the periodic structure 27 in the excitation light receiving surface of the wavelength conversion member 21.

While the embodiment of the present invention has been described above, the present invention is not limited to the embodiment described above. Various modifications can be made thereto.

For example, although the wavelength conversion member is preferably formed by the fluorescence member and the periodic structure layer from the viewpoint of the ease of manufacturing, the wavelength conversion member may be formed by a fluorescence member having a specified periodic structure formed in the front surface thereof.

Specifically, the wavelength conversion member may have the same configuration as the wavelength conversion member 21 constituting the fluorescence light source device 10 shown in FIG. 1 except that, for example, no periodic structure layer is provided and a periodic structure is formed in the front surface of the fluorescence member, which is the excitation light receiving surface, in the wavelength conversion member 21 constituting the fluorescence light source device 10 shown in FIG. 1.

Alternatively, the wavelength conversion member may be configured so that the fluorescence emission surface in the wavelength conversion member is formed by the surface that constitutes the excitation light receiving surface and a surface opposed thereto.

Moreover, the configuration of the entire fluorescence light source device is not limited to the configuration shown in FIG. 1, and various configurations may be adopted. For example, although light from a single excitation laser light source (for example, a laser diode) is used in the fluorescence light source device shown in FIG. 1, a plurality of excitation laser light sources may be provided and a condensing lens may be disposed in front of the wavelength conversion member so that the wavelength conversion member is irradiated with condensed light. Moreover, excitation laser light is not limited to the laser light from the laser diode. Various excitation laser light sources can be employed as long as the light sources can emit laser light capable of exciting the wavelength conversion member. Here, an excitation laser light source that emits light having an appropriate wavelength according to, for example, a type of the phosphor constituting the wavelength conversion member (fluorescence member) is employed as the excitation laser light source. For example, an excitation laser light source that emits light with a wavelength of 445 to 465 nm is employed.

The experimental examples performed to confirm the functions and effects of the present invention will be described below.

Experimental Example 1

First, five kinds of resin beads for forming pores with diameters of 250 nm, 500 nm, 1000 nm, 2000 nm and 4000 nm were prepared. With these five kinds of resin beads, a plurality of wavelength conversion members (21), each having the configuration of FIG. 1, containing micro-scatterers (25) formed by pores with a diameter of 250 nm, 500 nm, 1000 nm, 2000 nm or 4000 nm and having a different ratio (T/R), were produced according to the technique (1) described above. The plurality of wavelength conversion members (21) contain pores as the micro-scatterers (25) and have a porosity higher than 0.5%. In each of the plurality of wavelength conversion members (21), a periodic structure layer (26) was obtained by forming a sputtering film on a front surface of a fluorescence member (22) and forming a structure of projections and depressions in a front surface of the sputtering film. The produced wavelength conversion members (21) have the following specifications.

Also, a wavelength conversion member having the same configuration as the above-described plurality of wavelength conversion members (21) except that no micro-scatterers (25) are contained was produced. A porosity of a fluorescence member (22) in this wavelength conversion member (21) is not higher than 0.5%.

In each of the produced wavelength conversion members (21) containing the micro-scatterers (25), a ratio (T/R) was calculated on the basis of values obtained by measuring a light transmission percentage T [%] and a light reflection percentage R [%] through the use of a semispherical integrating sphere and the irradiation of light (non-excitation light) with a wavelength of 600 nm.

Fluorescence Member (22):
  Material: polycrystalline phosphor made of YAG:Ce (doped amount of Ce: 0.5 mol %, refractive index=1.83, excitation wavelength=445 nm, fluorescence wavelength=550 nm), dimensions: 5 mm (length)×5 mm (width)×0.13 mm (thickness)

Periodic Structure Layer (26):
  Material: $ZrO_2$ (refractive index=2.1), dimensions: 5 mm (length)×5 mm (width)×550 nm (maximum thickness), shape of periodic structure (27): height (h) of circular truncated conical projection (28)=280 nm, width of lower base of projection (28)=370 mm, pitch (d)=460 nm, aspect ratio (h/d)=0.6, thickness of thin film portion (thickness of portion other than projections (28)): 270 nm Each of the produced wavelength conversion members (21) was used to produce a fluorescence-emitting member (20) having the following specifications.

Figure 2:
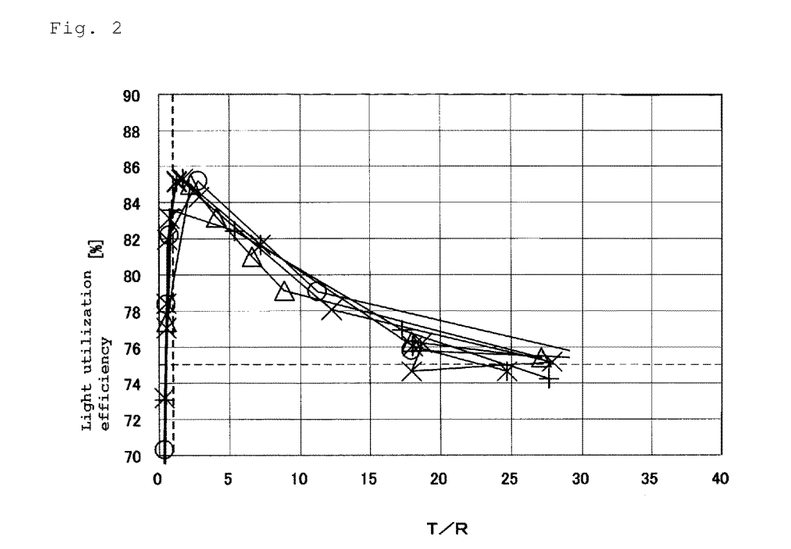
FIG. 2 is a graph showing relationships between ratios (T/R) and light utilization efficiency obtained in Experimental Example 1.

A front surface of the wavelength conversion member (21) (front surface of the fluorescence member (22)) in each of the produced fluorescence-emitting members (20) was then irradiated with excitation laser light to measure light extraction efficiency at such a front surface. Light utilization efficiency was then calculated by multiplying the obtained light extraction efficiency by the light transmission percentage T [%] on the basis of Formula (1) described above. The light utilization efficiency of the wavelength conversion member (21) containing no micro-scatterers (25) was 75%. Also, results about each of the wavelength conversion members (21) containing the micro-scatterers (25) are shown in FIG. 2. FIG. 2 is a graph showing relationships between ratios (T/R) and light utilization efficiency. The measured results of the fluorescence-emitting member (20) relating to the wavelength conversion member containing the micro-scatterers (25) with a diameter of 250 nm are shown by triangle plotting. Also, the measured results of the fluorescence-emitting member (20) relating to the wavelength conversion member (21) containing the micro-scatterers (25) with a diameter of 500 nm are shown by multiplication sign plotting. The measured results of the fluorescence-emitting member (20) relating to the wavelength conversion member (21) containing the micro-scatterers (25) with a diameter of 1000 nm are shown by asterisk plotting. The measured results of the fluorescence-emitting member (20) relating to the wavelength conversion member (21) containing the micro-scatterers (25) with a diameter of 2000 nm are shown by circle plotting. The measured results of the fluorescence-emitting member (20) relating to the wavelength conversion member (21) containing the micro-scatterers (25) with a diameter of 4000 nm are shown by plus sign plotting. In this figure, a broken straight line parallel to the vertical axis on the graph is a reference line with a ratio (T/R) of 1. A broken straight line parallel to the horizontal axis on the graph is a reference line with light utilization efficiency of 75%. Note that the value of the light utilization efficiency about this reference line, 75%, is on the basis of the light utilization efficiency of the wavelength conversion member (21) containing no micro-scatterers (25).

Substrate (31):
  Material: Mo—Cu substrate, external dimensions: 17 mm (length)×17 mm (width)×0.5 mm
Light Reflection Film:
  Material: silver, thickness: 110 nm
Light Diffusion Film:
  Material: inorganic diffusion material (product obtained by drying a suspension of an alkaline aqueous solution and microparticles of silica and titanium oxide), light diffusion property: reflectance of light with wavelength of 550 nm is not lower than 95.7%
Bonding Member:
  Material: solder (gold-tin (AuSn) alloy (percentage of Sn content is 20 mass %))

Experimental Example 2

A plurality of wavelength conversion members (21), each having the configuration of FIG. 1, containing micro-scatterers (25) formed by scattering microparticles with a diameter of 2000 nm, 3000 nm, 5000 nm or 8000 nm and having ratios (T/R) different from one another, were produced by the technique same as that used in Experimental Example 1 except that four kinds of scattering microparticles formed from strontium fluoride ($SrF_2$, a refractive index of 1.38) and each having a diameter of 2000 nm, 3000 nm, 5000 nm or 8000 nm were used instead of the five kinds of resin beads in Experimental Example 1. Here, the ratios (T/R) were calculated by the same technique as Experimental Example 1.

Figure 3:
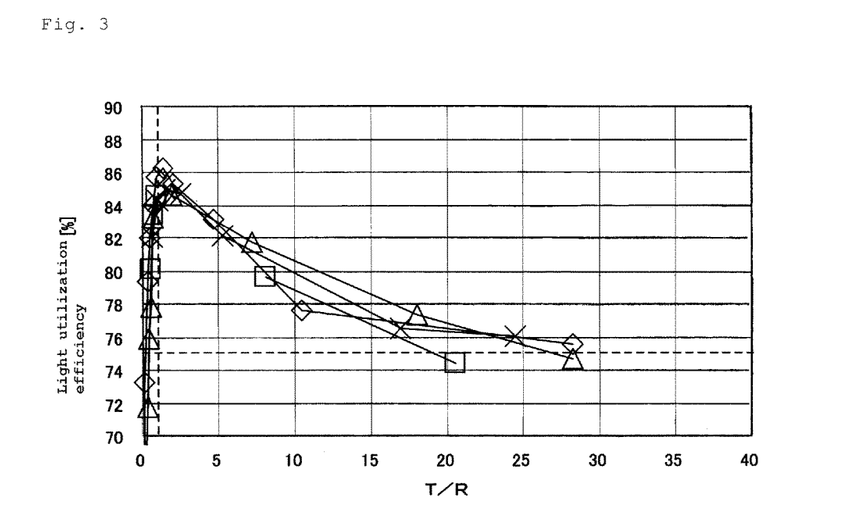
FIG. 3 is a graph showing relationships between ratios (T/R) and light utilization efficiency obtained in Experimental Example 2.

Each of the produced wavelength conversion members (21) was then used to produce a fluorescence-emitting member (20) having the aforementioned specifications same as the fluorescence-emitting member (20) of Experimental Example 1. In each of these fluorescence-emitting members (20), a front surface of the wavelength conversion member (21) (front surface of the fluorescence member (22)) was irradiated with excitation laser light, and light extraction efficiency at such a front surface was measured. Thereafter, light utilization efficiency was calculated by multiplying the obtained light extraction efficiency by the light transmission percentage T [%] on the basis of Formula (1) described above. The results are shown in FIG. 3. FIG. 3 is a graph showing relationships between ratios (T/R) and light utilization efficiency. The measured results of the fluorescence-emitting member (20) relating to the wavelength conversion member (21) containing the micro-scatterers (25) with a diameter of 2000 nm are shown by rhomboid plotting. Also, the measured results of the fluorescence-emitting member (20) relating to the wavelength conversion member (21) containing the micro-scatterers (25) with a diameter of 3000 nm are shown by square plotting. The measured results of the fluorescence-emitting member (20) relating to the wavelength conversion member (21) containing the micro-scatterers (25) with a diameter of 5000 nm are shown by triangle plotting. The measured results of the fluorescence-emitting member (20) relating to the wavelength conversion member (21) containing the micro-scatterers (25) with a diameter of 8000 nm are shown by multiplication sign plotting. In this figure, a broken straight line parallel to the vertical axis on the graph is a reference line with a ratio (T/R) of 1. A broken straight line parallel to the horizontal axis on the graph is a reference line with light utilization efficiency of 75%. Note that the value of the light utilization efficiency about this reference line, 75%, is on the basis of the light utilization efficiency of the wavelength conversion member (21) containing no micro-scatterers (25) as with FIG. 2.

Experimental Example 3

A plurality of wavelength conversion members (21), having the configuration of FIG. 1, each containing micro-scatterers (25) formed by scattering microparticles with a diameter of 500 nm, 1000 nm, 2000 nm or 5000 nm and having ratios (T/R) different from one another, were produced by the technique same as that used in Experimental Example 1 except that four kinds of scattering microparticles formed from alumina (a refractive index of 1.76) and each having a diameter of 500 nm, 1000 nm, 2000 nm or 5000 nm were used instead of the five kinds of resin beads in Experimental Example 1. Here, the ratios (T/R) were calculated by the same technique as Experimental Example 1.

Figure 4:
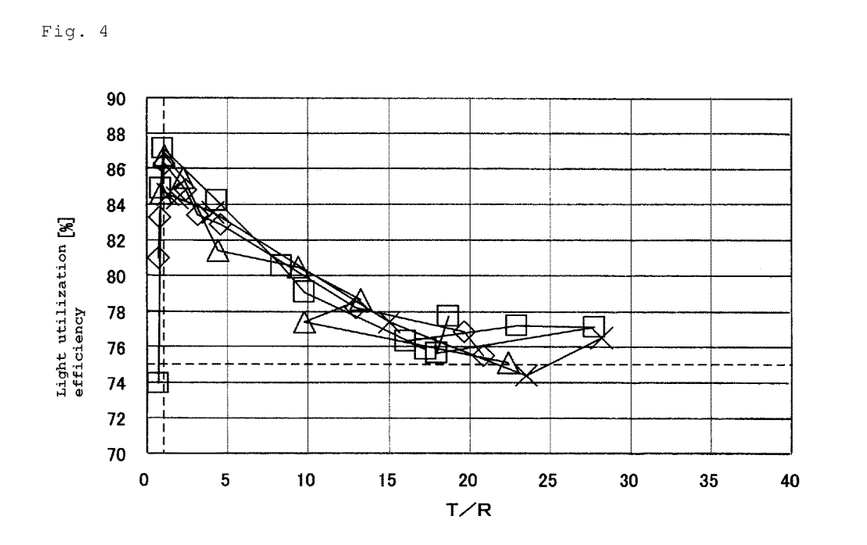
FIG. 4 is a graph showing relationships between ratios (T/R) and light utilization efficiency obtained in Experimental Example 3.

Each of the produced wavelength conversion members (21) was then used to produce a fluorescence-emitting member (20) having the aforementioned specifications same as the fluorescence-emitting member (20) of Experimental Example 1. In each of these fluorescence-emitting members (20), a front surface of the wavelength conversion member (21) (front surface of the fluorescence member (22)) was irradiated with excitation laser light, and light extraction efficiency at such a front surface was measured. Thereafter, light utilization efficiency was calculated by multiplying the obtained light extraction efficiency by the light transmission percentage T [%] on the basis of Formula (1) described above. The results are shown in FIG. 4. FIG. 4 is a graph showing relationships between ratios (T/R) and light utilization efficiency. The measured results of the fluorescence-emitting member (20) relating to the wavelength conversion member (21) containing the micro-scatterers (25) with a diameter of 500 nm are shown by rhomboid plotting. Also, the measured results of the fluorescence-emitting member (20) relating to the wavelength conversion member (21) containing the micro-scatterers (25) with a diameter of 1000 nm are shown by square plotting. The measured results of the fluorescence-emitting member (20) relating to the wavelength conversion member (21) containing the micro-scatterers (25) with a diameter of 2000 nm are shown by triangle plotting. The measured results of the fluorescence-emitting member (20) relating to the wavelength conversion member (21) containing the micro-scatterers (25) with a diameter of 5000 nm are shown by multiplication sign plotting. In this figure, a broken straight line parallel to the vertical axis on the graph is a reference line with a ratio (T/R) of 1. A broken straight line parallel to the horizontal axis on the graph is a reference line with light utilization efficiency of 75%. Note that the value of the light utilization efficiency about this reference line, 75%, is on the basis of the light utilization efficiency of the wavelength conversion member (21) containing no micro-scatterers (25) as with FIGS. 2 and 3.

It was confirmed from the results of Experimental Examples 1 to 3 that higher light utilization efficiency (specifically, not lower than 75%) could be obtained when the wavelength conversion member including the specified periodic structure in the excitation light receiving surface, containing the micro-scatterers with a refractive index of not lower than 1.0 and having a ratio (T/R) within a range of 1 to 20 was used than when the wavelength conversion member containing no micro-scatterers was used. In other words, it was confirmed that high luminous efficiency could be obtained with the fluorescence light source device of the present invention. Moreover, it was confirmed that higher light utilization efficiency of not lower than 78% could be obtained when the wavelength conversion member had a ratio (T/R) within a range of 1 to 10, in particular.

Moreover, it was confirmed that the micro-scatterers in the wavelength conversion member could be formed by either pores or scattering microparticles. On the basis of this, it is found out that a micro-scatterer with a refractive index of not lower than 1.0 in the wavelength conversion member can be formed by any one of a pore, a scattering microparticle and a grain boundary precipitation phase or any combination thereof. When the micro-scatterers were formed by scattering microparticles (inorganic compound particles), in particular, it was confirmed that the ratio (T/R) could fall within a range of 1 to 20 by providing the periodic structure by arranging the projections in a two-dimensional periodic pattern, setting the thickness of the fluorescence member to a range of 0.05 to 0.2 mm and setting the diameter of the micro-scatterer to 500 to 8000 nm.

Figure 5:
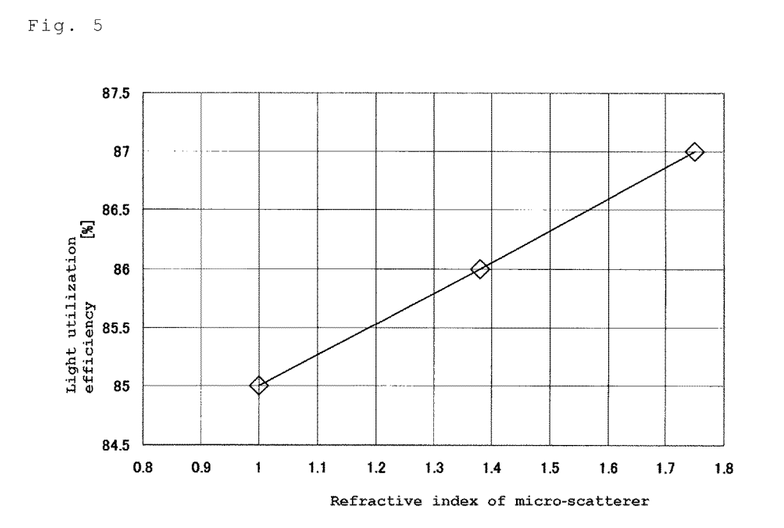
FIG. 5 is a graph showing a relationship between a refractive index of a micro-scatterer and light utilization efficiency obtained on the basis of the results of Experimental Examples 1 to 3.

Moreover, a relationship between a refractive index of a micro-scatterer and the maximum light utilization efficiency was confirmed on the basis of the results of Experimental Examples 1 to 3. The maximum utilization efficiency as used herein refers to the maximum value of the light utilization efficiency obtained in each of Experimental Examples 1 to 3. The result is shown in FIG. 5.

It was confirmed from this result that the light utilization efficiency increased in proportion to the refractive index of the micro-scatterer.

REFERENCE SIGNS LIST 10 fluorescence light source device
11 laser diode
15 collimator lens
16 dichroic mirror
17 condenser lens
20 fluorescence-emitting member
21 wavelength conversion member
22 fluorescence member
25 micro-scatterer
26 periodic structure layer
27 periodic structure
28 projection
31 substrate
40 fluorescence light source device
41 fluorescence member
43 bonding part
46 excitation laser light source
48 lens
49 light reflective substrate
L excitation light
L1 fluorescence

The invention claimed is:

1. A fluorescence light source device comprising a wavelength conversion member for emitting fluorescence by excitation laser light, wherein
the wavelength conversion member has an excitation light receiving surface including a periodic structure having a periodic array of conical or truncated projections with an aspect ratio, which is a ratio of a height of the projection to a pitch in the periodic structure, of not lower than 0.2,
the wavelength conversion member is formed from a phosphor composed of a polycrystal, and contains a micro-scatterer with a refractive index of not lower than 1.0 for scattering the excitation laser light and fluorescence emitted from the phosphor, and a ratio (T/R) between a light transmission percentage T [%] in the wavelength conversion member and a light reflection percentage R [%] in the wavelength conversion member is 1 to 20.

2. The fluorescence light source device according to claim 1, wherein the light transmission percentage T [%] in the wavelength conversion member is a light transmission percentage for light with a wavelength of 600 nm, and the light reflection percentage R [%] in the wavelength conversion member is a light reflection percentage for light with a wavelength of 600 nm.

3. A fluorescence light source device comprising a wavelength conversion member for emitting fluorescence by excitation laser light, wherein the wavelength conversion member has an excitation light receiving surface including a periodic structure having a two-dimensional periodic array of conical or truncated projections, the wavelength conversion member has a fluorescence member formed from a phosphor composed of a polycrystal, the fluorescence member has a thickness of 0.05 to 0.2 mm and contains a micro-scatterer formed from an inorganic compound particle with a refractive index of not lower than 1.0 for scattering the excitation laser light and fluorescence emitted from the phosphor, and the micro-scatterer has a diameter of 500 to 8000 nm, and the wavelength conversion member has a ratio (T/R) between a light transmission percentage T [%] in the wavelength conversion member and a light reflection percentage R [%] in the wavelength conversion member within a range of 1 to 20.

4. The fluorescence light source device according to claim 3, wherein the inorganic compound particle is composed of alumina.

5. The fluorescence light source device according to claim 3, wherein an aspect ratio, which is a ratio of a height of the projection to a pitch in the periodic structure, is not lower than 0.2.

* * * * *